US011280682B2

(12) United States Patent
Jones, III et al.

(10) Patent No.: US 11,280,682 B2
(45) Date of Patent: Mar. 22, 2022

(54) TEMPERATURE SENSOR CIRCUIT

(71) Applicant: NXP USA, INC., Austin, TX (US)

(72) Inventors: Robert S. Jones, III, Austin, TX (US); Tao Chen, Austin, TX (US)

(73) Assignee: NXP USA, INC., Austin, TX (US)

( * ) Notice: Subject to any disclaimer, the term of this patent is extended or adjusted under 35 U.S.C. 154(b) by 160 days.

(21) Appl. No.: 16/559,671

(22) Filed: Sep. 4, 2019

(65) Prior Publication Data

US 2021/0063246 A1  Mar. 4, 2021

(51) Int. Cl.
*G01K 7/00* (2006.01)
*G01K 7/01* (2006.01)
*G01K 13/08* (2006.01)

(52) U.S. Cl.
CPC .............. *G01K 7/01* (2013.01); *G01K 13/08* (2013.01)

(58) Field of Classification Search
USPC .......................... 374/178, 170, 166; 327/512
See application file for complete search history.

(56) References Cited

U.S. PATENT DOCUMENTS

| 8,207,724 | B2 | 6/2012 | Riehl | |
|---|---|---|---|---|
| 8,665,130 | B2 | 3/2014 | Makinwa et al. | |
| 2010/0098133 | A1* | 4/2010 | Shin | G01K 7/015 |
| | | | | 374/170 |
| 2015/0362380 | A1* | 12/2015 | Kohola | G05F 3/30 |
| | | | | 374/170 |
| 2016/0258819 | A1* | 9/2016 | Xia | G01K 7/015 |

* cited by examiner

*Primary Examiner* — Mirellys Jagan
(74) *Attorney, Agent, or Firm* — David G. Dolezal (57) ABSTRACT

A temperature sensor circuit that includes two banks of bipolar transistors where the bipolar transistors of each bank are coupled in parallel in a current leg of the sensor circuit. The current legs are configured to produce voltages and currents that are dependent upon the temperature sensitivity of the bipolar transistors in the current legs. The sensor circuit includes a controller that, in some embodiments, periodically enables subsets of the bipolar transistors of each of bank during operation.

20 Claims, 5 Drawing Sheets

|  | Q2 TRANSISTORS | PERIOD #1 | PERIOD #2 | PERIOD #3 | PERIOD #4 | PERIOD #5 | PERIOD #6 | PERIOD #7 | PERIOD #8 |
|---|---|---|---|---|---|---|---|---|---|
| 1ST ROTATION | Q2_1-Q2_8 | Q1_1 | Q1_2 | Q1_3 | Q1_4 | Q1_5 | Q1_6 | Q1_7 | Q1_8 |
| 2ND ROTATION | Q2_9-Q2_16 | Q1_9 | Q1_10 | Q1_11 | Q1_12 | Q1_13 | Q1_14 | Q1_15 | Q1_16 |
| 3RD ROTATION | Q2_17-Q2_24 | Q1_17 | Q1_18 | Q1_19 | Q1_20 | Q1_21 | Q1_22 | Q1_23 | Q1_24 |
| 4TH ROTATION | Q2_25-Q2_32 | Q1_25 | Q1_26 | Q1_27 | Q1_28 | Q1_29 | Q1_30 | Q1_31 | Q1_32 |

TEMPERATURE SENSOR CIRCUIT

BACKGROUND OF THE INVENTION

Field of the Invention

This invention relates in general to temperature sensor circuits.

Background

Electronic systems utilize temperature sensor circuits for measuring temperature. Some temperature sensor circuits utilize bipolar transistors in generating a current that is indicative of the temperature. Some temperature sensor circuits may include two current legs with a different number of bipolar transistors in each current leg. The voltage of one the nodes of one of the legs is sensitive to temperature and is used to generate a current that is indicative of a temperature.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The Figures are not necessarily drawn to scale.

DETAILED DESCRIPTION

The following sets forth a detailed description of a mode for carrying out the invention. The description is intended to be illustrative of the invention and should not be taken to be limiting.

Disclosed herein is a temperature sensor circuit that includes two banks of bipolar transistors where the bipolar transistors of each bank are coupled in parallel in a current leg of the sensor circuit. The current legs are configured to produce a voltage that is dependent upon the temperature sensitivity of the bipolar transistors in the current legs. The sensor circuit includes a controller that periodically enables subsets of the bipolar transistors of each of bank during operation. The one bank has a greater effective emitter area of enabled transistor than the other bank. Errors in temperature sensing in due to bipolar transistor mismatch can be reduced by the periodic selective use of multiple bipolar transistors of a bank.

Figure 1:
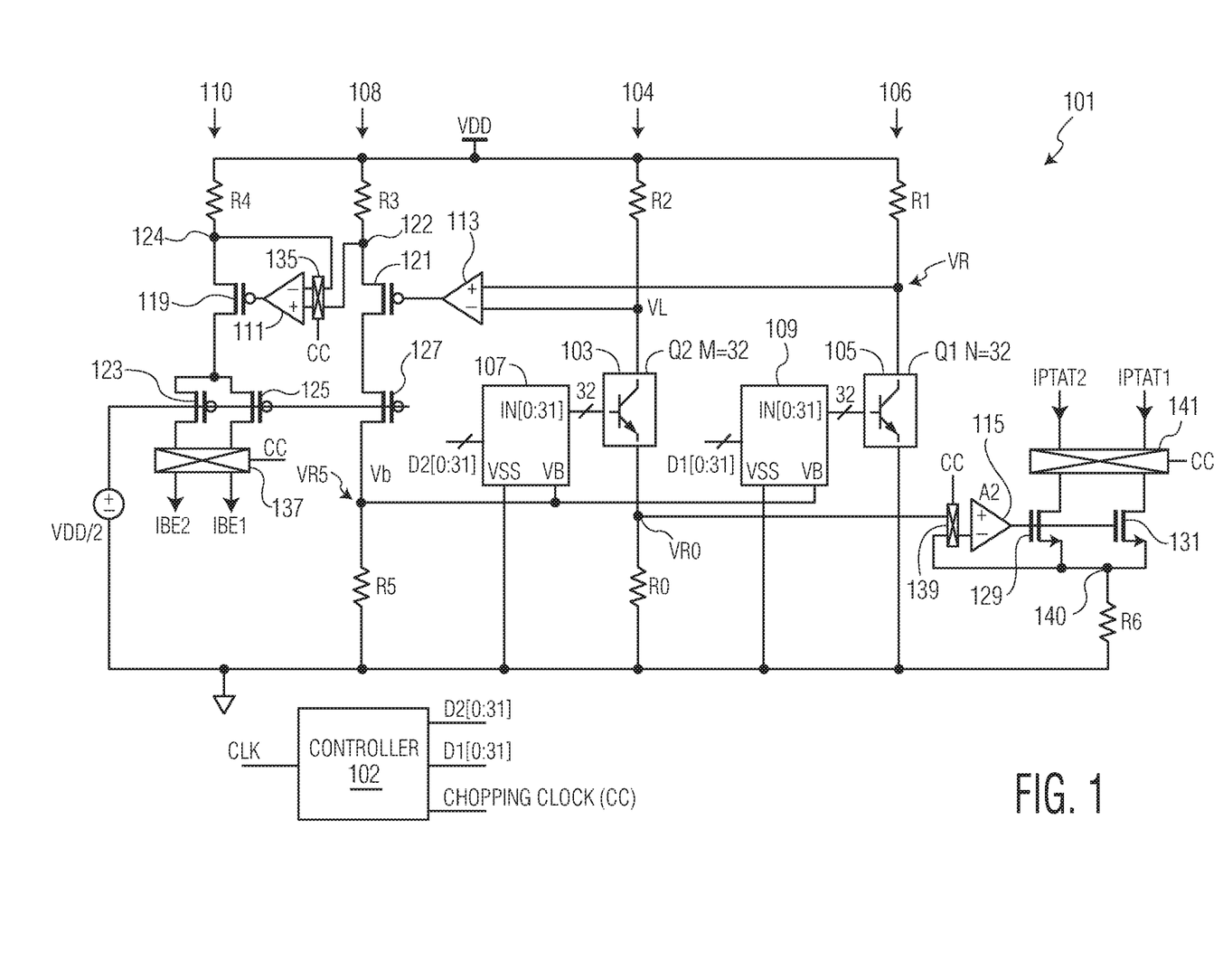
FIG. 1 is a circuit diagram of a temperature sensor circuit according to one embodiment of the present invention.

FIG. 1 is a circuit diagram of a temperature sensor circuit according to one embodiment of the present invention. In the embodiment shown, temperature sensor circuit 101 includes four outputs for producing currents that are indicative of temperature and which are based on the temperature sensitivity of bipolar transistors of circuit 101. IPTAT2 and IPTAT1 are proportional-to-absolute temperature (PTAT) current signals whose current magnitude changes directly proportionally to the absolute temperature and currents IBE2 and IBE1 are complementary-to-absolute temperature (CTAT) current signals whose current magnitude changes proportionally to absolute temperature but with a negative coefficient. In one embodiment, temperature sensor circuit 101 may be used to generate a current signals indicative of temperature that can be provided to an Analog-to-Digital converter (not shown) to convert into digital code that can be translated into real temperature readings. These temperature sensors can be used for various applications such as temperature monitoring within an integrated circuit or external to the integrated circuit. In other embodiments, the IPTAT signals and the IBE signals are used to produce a reference signal that is relatively invariant to temperature such as with a band gap circuit.

Sensor circuit 101 includes two current legs 104 and 106. Current leg 104 includes resistor R2, bipolar transistor bank 103, and resistor R0. Current leg 106 includes resistor R1 and bipolar transistor bank 105. Each of transistor bank 103 and 105 includes a bank of bipolar transistors that are periodically selectively enabled to conduct current flowing through the leg for producing a voltage at node VR0 that is indicative of temperature. In the embodiment shown, each bank 103 and 105 includes 32 NPN bipolar transistors, but banks in other embodiments may include a different number and/or a different type of bipolar transistor (e.g. PNP). In the embodiment shown, at any given time during the operation of circuit 101, bank 103 has a greater effective emitter area of enabled bipolar transistors than the effective emitter area of enabled bipolar transistors of bank 105.

Because the effective emitter area of enabled transistors in bank 103 is greater than the effective emitter area of enabled transistors in bank 105 and because leg 106 does not include a resistor corresponding to resistor R0, node VR0 of leg 104 produces a voltage during the operation of circuit 101 that is indicative of the temperature. For a bipolar transistor, the VBE (base to emitter voltage) is complementary to absolute temperature (CTAT). When the temperature increases, VBE decreases linearly (proportional but with a negative coefficient). For two transistors with different current densities, the VBE difference is PTAT (proportional to absolute temperature). A device with a larger current density also has a larger VBE. So, for the same current, a device with a larger emitter area has less current density, thus has less VBE. Accordingly, the voltage across R0 is PTAT.

Specifically, in the embodiment shown where each of the transistors of bank 103 and bank 105 have the same emitter area, more bipolar transistors in bank 103 are enabled than in bank 105 at any one time to provide bank 103 with a greater effective emitter area of enabled transistors than bank 105. The effective emitter area of enabled transistors of a bank is dependent on the number of enabled transistors of the bank. The more enabled transistors of a bank at one time, the greater the effective emitter area of the bank for that time. In one embodiment, at any one time, eight times as many transistors are enabled in bank 103 as are enabled in bank 105. However, this ratio may be a different number in other embodiments.

In other embodiments, each of the transistors of bank 103 have a greater emitter area than the transistors of bank 105. Accordingly, in some of these embodiments, the number of enabled transistors in bank 103 may be the same or less than the number of enabled transistors in bank 105 wherein bank 103 would have a greater effective emitter area of enabled transistors due to the transistors of bank 103 each having a greater emitter area.

In one embodiment, the resistance of resistor R2 equals the resistance of resistor R1 (e.g. in the range of 10-20K Ohms), although they may be of other values in other embodiments. One advantage with utilizing NPN transistors for temperature measurement is that they have a larger beta value than with PNP bipolar transistors which generates less error in the temperature readings. Furthermore, in some embodiments, NPN transistors are less parasitic to process and may be tracked more closely in manufacturing.

Figure 3:
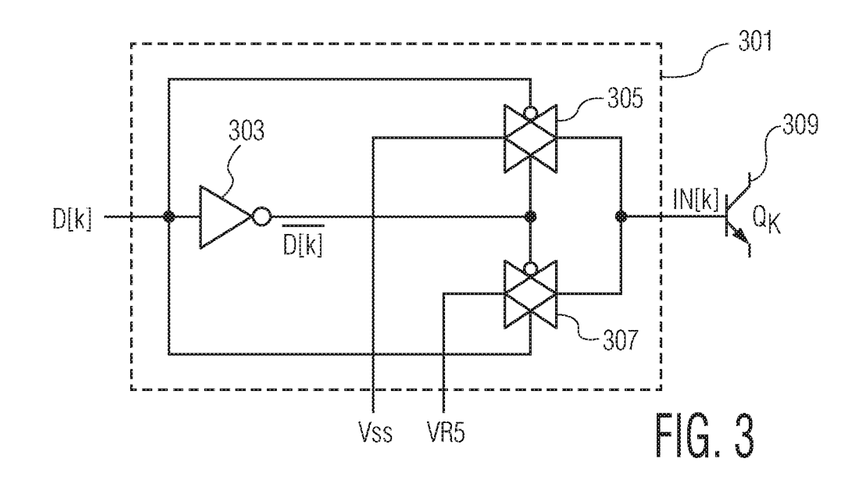
FIG. 3 is a circuit diagram of a multiplexer circuit according to one embodiment of the present invention.

In the embodiment shown, circuit 101 includes multiplexer block 107 for selectively enabling the transistors of bank 103 and multiplexer block 109 for selectively enabling the transistors of bank 105. In one embodiment, each of multiplexer blocks 107 and 109 includes a number of multiplexer circuits (e.g. multiplexer circuit 301 of FIG. 5) corresponding to the number of bipolar transistors of the transistor bank that it is coupled to. In the embodiment shown, multiplexer blocks 107 and 109 each include 32 multiplexer circuits. Each multiplexer circuit is for controlling the base electrode of a corresponding bipolar transistor as directed by a control signal (D2[0:31], D1[0:31]) received from controller 102. In the embodiment shown, each multiplexer circuit enables its bipolar transistor by providing a voltage from node VR5 that places the transistor in a conductive state in response to an asserted state of its corresponding control signal from controller 102. In one embodiment, an enabled transistor is biased in the forward active region during operation. Each multiplexer circuit disables its transistor by providing a VSS voltage to the base electrode of its corresponding bipolar transistor in response to a non-asserted state of its corresponding control signal from controller 102.

Controller 102 asserts different combinations of control signals (D2[0:31], D1[0:31]) during different periods of operation such that the number of enabled bipolar transistors of bank 103 is 8 times more than the number of enabled transistors of bank 105. Controller rotates which transistors of each bank are enabled at different times so as to average out the temperature response differences of the different bipolar transistors due to device mismatch. For example, at any one time, 8 transistors of bank 103 may be enabled and one transistor of bank 105 may be enabled. However, the ratios and/or the number of transistors enabled at any one time may be different. For example, in one embodiment, all of the transistors of bank 103 and four of the transistors of bank 105 may be enabled at one time.

Current leg 108 includes resistor R3, field effect transistor 121, field effect transistor 127, and resistor R5. During operation, amplifier 113 controls the conductivity of transistor 121, which controls the voltage of node VR5, which controls the base electrode voltage of the enabled bipolar transistors, which controls the conductivity of the enabled bipolar transistors such that the voltage of nodes VL and VR are equal. Because bank 103 has a greater effective emitter area due to a greater number of enabled bipolar transistors than bank 105 at any one time, the voltage drop across bank 103 will be less than the voltage drop across bank 105 by the voltage of node VR0. Because bipolar transistors are relatively sensitive to temperature, the voltage of node VR0 will also vary with temperature as well. In one embodiment, R0 is the same resistance as R5 (e.g. 50 K Ohms), but may be different in other embodiments.

Figure 4:
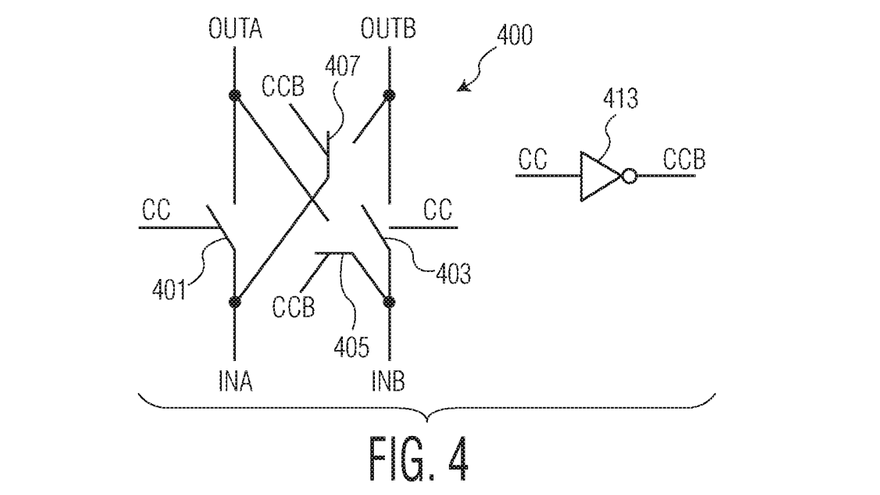
FIG. 4 is a circuit diagram of a chopper circuit according to one embodiment of the present invention.

Circuit 101 includes amplifier 115 that includes an output to control the conductivity of transistors 129 and 131 for controlling the magnitude of current of signals IPTAT2 and IPTAT1 base on the voltage of node VR0. Node VR0 and node 140 are connected to chopper circuit 139. Chopper circuit 139, as per chopper clock signal (CC), alternates between coupling node VR0 to the non-inverting input of amplifier 115 and node 140 to the inverting input of amplifier 115 and coupling node VR0 to the inverting input of amplifier 115 and node 140 to the non-inverting input of amplifier 115. In this manner, the voltage of node VR0 controls the current magnitude of IPTAT2 and IPTAT1 where the voltage of node 140 matches the voltage of node VR0 while minimizing current error due to a mismatch of the devices of amplifier 115. An example of a chopper circuit 139 is shown in FIG. 4. Some embodiments do not include chopper circuit 139. In one embodiment, the resistance of resistor R6 is equal to the resistance of resistor R0.

Circuit 101 also includes a chopper circuit 141 that, based on signal CC, alternates the IPTAT2 current signal from being provided by transistor 129 and being provided by transistor 131 and alternates the IPTAT1 current signal from being provided by transistor 131 and being provided by transistor 129. Chopper circuit 141 acts to minimize error in IPTAT2 and IPTAT1 due to device mismatch between transistors 129 and 131. Some embodiments may not include chopper circuit 141.

Circuit 101 includes a current leg 110 for producing CTAT current signals IBE2 and IBE1. Leg 110 includes transistors 119, 123, and 125, resistor R4, and chopper circuit 137. In one embodiment, resistors R4 and R3 have the same resistance value (e.g. 5-20K Ohms). Amplifier 111 controls the conductivity of transistor 119 to control the current magnitude of signals IBE2 and IBE1. Amplifier 111 controls the conductivity of transistor 119 such that the voltage of node 124 matches the voltage of node 122 in order to control the magnitude of current provided by signals IBE2 and IBE1. Chopper circuit 135 alternately couples node 124 to the inverting input of amplifier 111 and node 122 to the non-inverting input of amplifier 111 and couples node 124 to the non-inverting input of amplifier 111 and node 122 to the inverting input of amplifier 111, as per the CC signal so as to minimize the error due to the mismatch of devices of amplifier 111 and resistors R4 and R3. Although some embodiments do not include chopper circuit 137.

Transistors 123, 125, and 127 are biased at ½ VDD such that they are of a sufficient conductivity so as to split the current of leg 110 into two equal halves (IBE1 and IBE2) and for current matching with leg 108. In some embodiments, transistor 127 is included in leg 108 for current matching.

Chopper circuit 137, based on signal CC, alternates the IBE2 signal from being provided by transistor 123 and being provided by transistor 125 and alternates the IBE1 signal from being provided by transistor 125 and being provided by transistor 123. Chopper circuit 137 acts to minimize error in currents IBE1 and IBE2 due to device mismatch between transistors 123 and 125. Some embodiments may not include chopper circuit 137.

Controller 102 provides control signals D1[0:31] and D2[0:31] as well the CC signal. In one embodiment, the CC signal is a clock signal having a frequency of 300 kHz, but may be at other frequencies in other embodiments. Controller 102 changes its signals based on a received clock signal (CLK). In one embodiment, controller 102 includes at least one counter and decoders (not shown) that provide the control signals D1[0:31] and D2[0:31]. In one embodiment, controller 102 includes a 5-bit output counter, a 5 bit to 32-bit decoder for providing the D1[0:31] signals, and a 2 bit to 4-bit decoder for providing the D2[0:31] signals (none shown). The inputs of the decoders would be coupled to the outputs of the counter. However, a controller may have other configurations in other embodiments.

Figure 2:
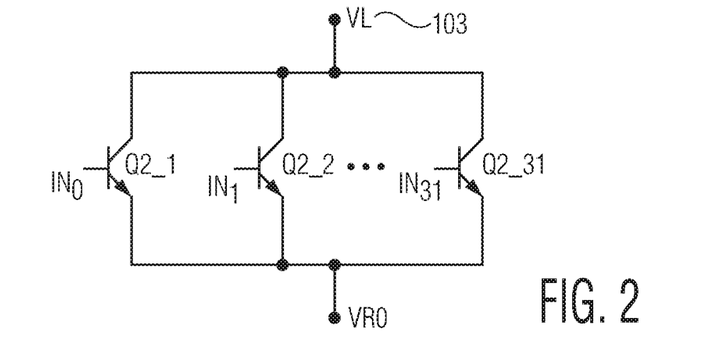
FIG. 2 is a circuit diagram of a bank of bipolar transistors coupled in parallel according to one embodiment of the present invention.

FIG. 2 is a circuit diagram of transistor bank 103 that includes 32 NPN bipolar transistors [Q2_0:Q2_31] coupled in parallel in current leg 104 between node VL and node VR0. The base electrode of each transistor is coupled to an output signal [IN0: IN31] from a multiplexer circuit of multiplexer block 107. The collectors of each NPN transistor is coupled to node VL and the emitter of each transistor are coupled to node VR0. Transistor bank 105 may be configured in a similar manner.

FIG. 3 is a circuit diagram of one multiplexer circuit 301 of multiplexer block 107. Multiplexer circuit 301 includes an inverter 303 having an input for receiving a control signal D[K] form controller 102. Multiplexer circuit 301 includes a passgate 305 that passes the voltage VSS to the output IN[K] when the control signal D[K] is de-asserted and passgate 307 that passes the voltage of node VR5 to output IN[K] when the control signal D[K] is asserted. Output signal IN[K] is provided to the base of NPN bipolar transistor 309. Other multiplexer circuits of multiplexer blocks 107 and 109 may have a similar configuration.

FIG. 4 is a circuit diagram of a chopper circuit according to one embodiment of the present invention that may be used for chopper circuits 137, 135, 139, and/or 141. Chopper circuit 400 includes inputs INA and INB and outputs OUTA and OUTB. Chopper circuit 400 also includes switches 401, 403, 405 and 407. Switches 401 and 403 are controlled by signal CC and switches 405 and 407 controlled by signal CCB, which is an inverted signal of signal CC generated by inverter 413. When signal CC is asserted, INA is coupled to OUTA and INB is coupled to OUTB. When signal CCB is asserted, INA is coupled to OUTB and INB is coupled to OUTA.

Figure 5:
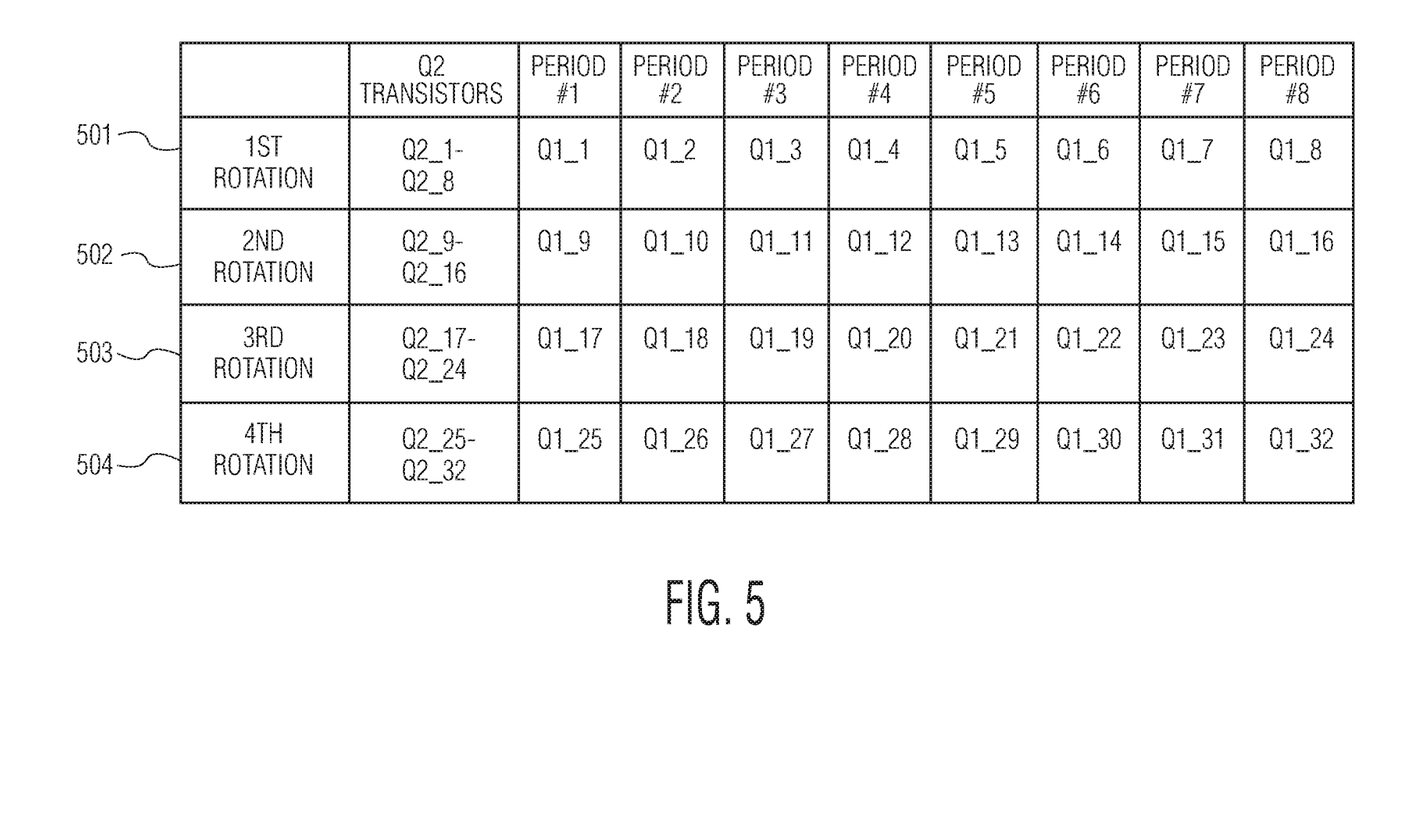
FIG. 5 is a table showing an enablement schedule for bipolar transistors of a temperature sensor circuit according to one embodiment of the present invention.

FIG. 5 shows a table illustrating how controller 102 periodically enables bipolar transistors in circuit 101 during operation according to one embodiment. In the table, Q2 represents the transistors of bank 103 and Q1 represents the transistors of bank 105. In the embodiment shown, the transistors of bank 103 and bank 105 have the same emitter area. With the schedule shown in FIG. 5, each Q2 transistor is enabled for eight periods and each Q2 transistor is enabled for one period over the 32 periods represented in the table of FIG. 5. Accordingly, at any one time, there will be eight Q2 transistors enabled and one Q1 transistor enabled. However, in other embodiments, other combinations of Q2 and Q1 transistors may be enabled at a time.

In FIG. 5, each row 501-504 represents a "rotation" that lasts for eight time periods, which are shown in the columns labeled "Period #1" through "Period #8." For all eight time periods of a rotation, the eight Q2 transistors listed in the column labeled "Q2 Transistors" are enabled and the other Q2 transistors are disabled. During each period, a different Q1 transistor is enabled with the rest of the Q1 transistors disabled. For example, in Period #1 of the first rotation, transistor Q1_1 is enabled and the rest of the Q1 transistors (Q1_2-Q1_32) are disabled. In Period #2, transistor Q1_2 is enabled and the rest of the Q1 transistors (Q1_1, Q1_3-Q1_32) are disabled. During the second rotation, Q2 transistors Q2_9-Q2_16 are enabled and the rest of the Q2 transistors are disabled. During each period of the second rotation, one of a second set of Q1 transistors (Q1_9-Q1_16) are enabled. The third rotation is run after the completion of the second rotation and the fourth rotation is run after the completion of the third rotation. The first rotation is rerun after the completion of the fourth rotation. In the embodiment shown, the Q2 and Q1 transistors of one rotation are mutually exclusive from the Q2 transistors and Q1 transistors of the other rotations. In one embodiment, each period last for 1/300 KHz seconds, but may last for other time periods in other embodiments.

Other embodiments may implement other scheduling schemes. For example, after the completion of the four rotations, the Q2 assignments to the rotations may change. Also, the Q1 assignments to each period may change as well. In some embodiments, all of the Q2 transistors may be enabled for each rotation. In another embodiment, the Q2 assignments change by one transistor for every change in the enablement of a Q1 transistor. For example, for the first period when Q1_1 is enabled, Q2 transistors Q2_1-Q2_8 are enabled. For a second period when Q1_2 is enabled, Q2 transistors Q2_2-Q2_9 are enabled, and so on. In such an embodiment, the Q2 combination of asserted transistors is always changing with each time period.

Figure 6:
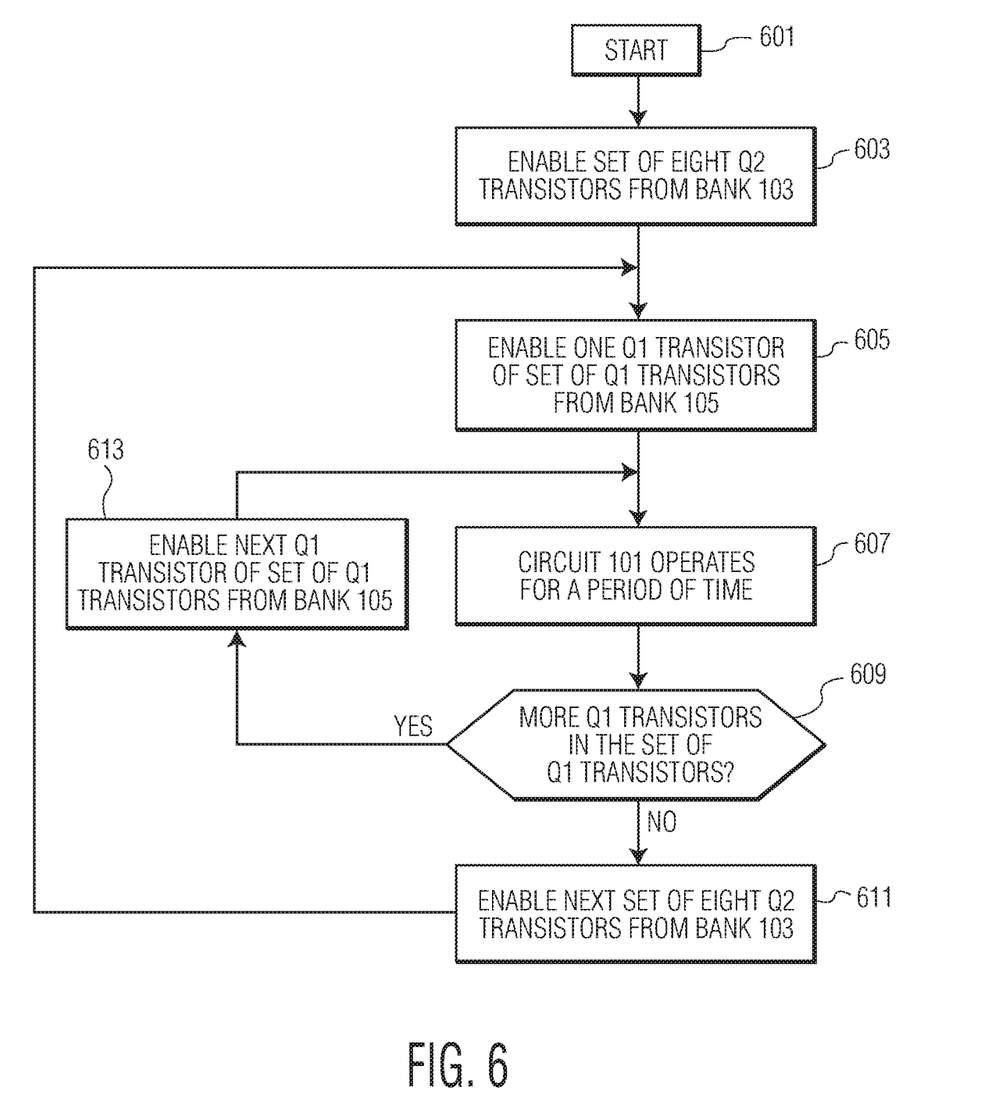
FIG. 6 is a flow chart showing the operation of a controller of a temperature sensor circuit according to one embodiment of the present invention.

FIG. 6 is a flow diagram showing the operation of controller 102 during the operation of circuit 101 according to one embodiment. In operation 601, the circuit is powered up and controller 102 starts its operation. In operation 603, controller 102 enables the first set of eight Q2 transistors (Q2_1-Q2_8) from bank 103 for a rotation. In one embodiment, controller enables a Q2 transistor by asserting a control signal (D2[0:031], See FIG. 1) provided to the multiplexer circuit of block 107 associated with the Q2 transistor so that the associated multiplexer circuit provides the voltage of node VR5 to the base electrode of the Q2 transistor to make the Q2 transistor conductive.

In operation 605, controller 102 enables one Q1 transistor of the first set of Q1 transistors (Q1_1-Q1_8) from bank 105. In one embodiment, controller enables a Q1 transistor by asserting a control signal (D1[0:031], See FIG. 1) provided to the multiplexer circuit of block 109 associated with the Q1 transistor so that the associated multiplexer provides the voltage of node VR5 to the base electrode of the Q1 transistor to make the Q1 transistor conductive.

In operation 607, circuit 101 operates for a period of time where the selected set of Q2 transistors are enabled and the selected Q1 transistor is enabled. In one embodiment, the period of time may be for one clock cycle of the clock signal (CLK) or it may be for multiple clock cycles. After the time period, if all of the Q1 transistors of the set have not been enabled during the current rotation, the next Q1 transistor of the set is enabled and operation 607 is performed again. Once all of the Q1 transistors of a set have been enabled for a time period during the rotation, then next set of Q2 transistors (Q2_9-Q2_16) from bank 103 is enabled (and the first set is disabled along with the reset of the Q2 transistors from bank 103) in operation 611. Operation 605 is then repeated where a Q1 transistor from a next set of Q1 transistors (Q1_9-Q1_16) is enabled. The process of FIG. 6 keeps repeating until all four rotations are performed and then repeats the rotations as long as circuit 101 continues to operate. In some embodiments, operations 603 or 613 are performed concurrently with the first performance of operation 605 for a rotation.

Figure 7:
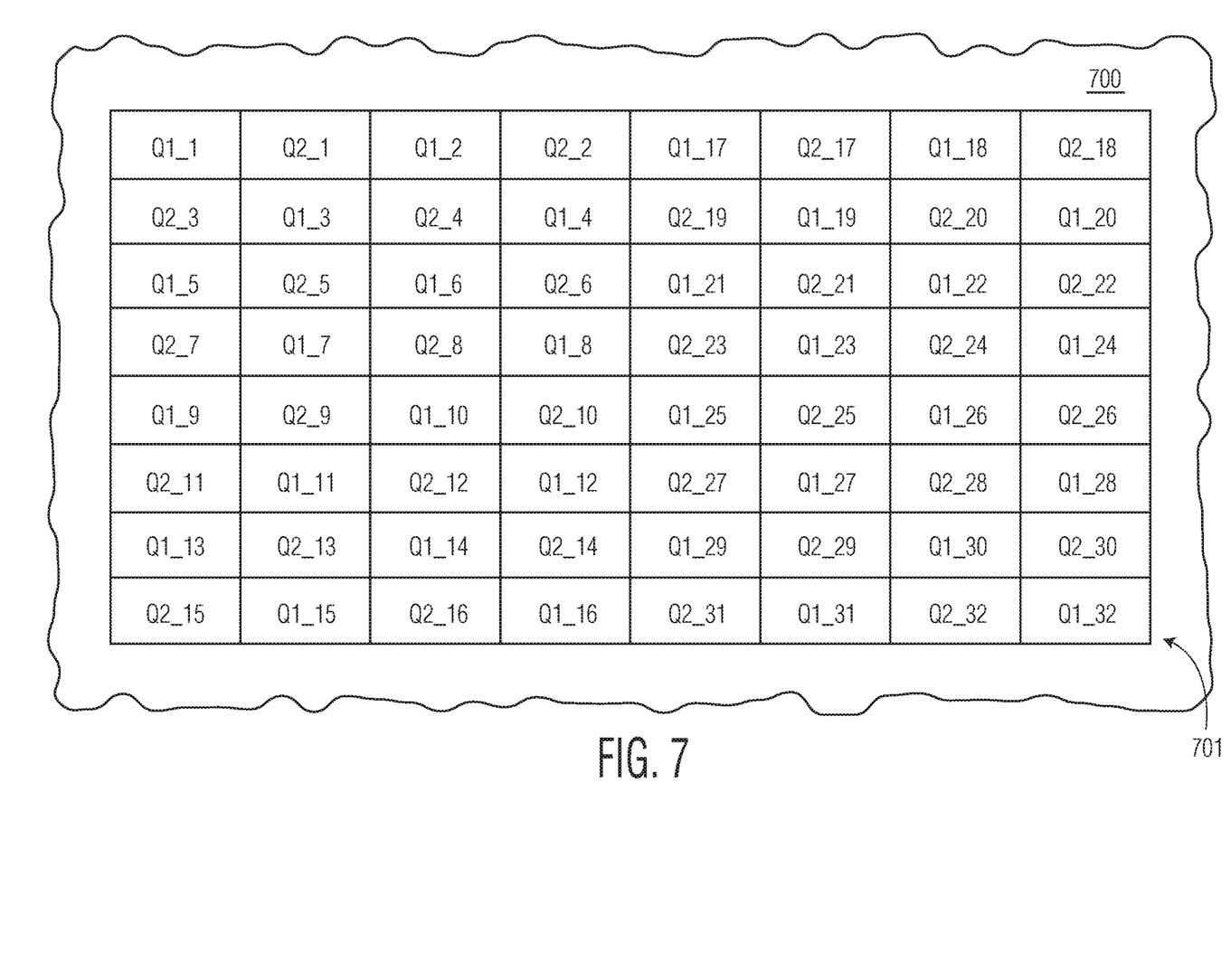
FIG. 7 is a partial top view of a die showing the locations of bipolar transistors of a temperature sensor circuit according to one embodiment of the present invention.

FIG. 7 shows a partial top view of a die 700 that includes an array 701 of bipolar transistors located in a substrate of the die. In the embodiment shown, each box represents a physical location of a Q1 transistor [Q1_1-Q1_32] of bank 105 or a Q2 transistors [Q2_1-Q2_32] of bank 103 in the substrate of die 700. As shown in FIG. 7, the Q1 and Q2 transistors are interspersed in the array. One advantage of interspersing the transistors is that errors in the generated currents due to manufacturing variations at different locations of the die can be averaged out to provide a more accurate output. Also, interspersing the transistors in a set over an array or over different portions of a die may average out variations due to aging. In one embodiment, the bipolar transistors are implemented on a die with FinFET transistors and with a minimum process critical dimension of 16 nm.

In other embodiments, the bipolar transistors may be arranged in other patterns in a die. In still other embodiments, transistors of a bank may be located in different areas of a die. For example, each Q2 transistor of a rotation (e.g. Q2_1 to Q2_8) may be located in one of 8 different locations of a die. This may minimize errors due to manufacturing variation and/or due to temperature variation as well.

In other embodiments, the timing of the change in enablement of the Q2 transistors may be changed with respect to the change in enablement of the Q1 transistors. For example, the Q2 transistors can be changed on even clock cycles of the CLK signal and Q1 transistors can be change on odd clock cycles. In addition, the chopper signal CC can change states at offsetting times from the change in the enablement of the Q1 and Q2 transistors. Furthermore, each chopper circuit may receive a clocking signal that is offset from the clocking signals provided to the other clocking signals. Offsetting the control signals may in some embodiments, help to reduce noise in the output current signals (IPTAT2, IPTAT1, IBE2, IBE1).

As described herein, a temperature circuit includes multiple bipolar transistors of a die that can be periodically selectively enabled to produce a current that provides an indication of temperature. Providing multiple transistors that can be selectively enabled, may in some embodiments, reduce the amount of error in the output currents due to transistor mismatch, location variation, and/or aging variation in that the variations can be averaged out during operation. Furthermore, selectively enabling only a subset of the transistors, but not all at one time, may provide for a temperature sensor that includes multiple transistors to reduce error due to mismatch and yet operates at a lower power in that not all of the multiple transistors are all enabled at the same time.

In one embodiment, a temperature sensor circuit includes a first current leg having a first bank of bipolar transistors coupled between a first circuit node and a second circuit node. The first bank includes a first plurality of bipolar transistors coupled in parallel with each other. The temperature sensor circuit includes a second current leg having a second bank of bipolar transistors coupled between a third circuit node and a fourth circuit node and a first resistor coupled to the fourth circuit node. The second bank includes a second plurality of bipolar transistors coupled in parallel with each other. The temperature sensor circuit includes a controller configured to, for a first time period, enable a first selected subset of the first plurality of bipolar transistors in the first bank and enable a first selected subset of the second plurality of bipolar transistors in the second bank. For the first time period, the second plurality of bipolar transistors has a greater effective emitter area of enabled bipolar transistors than an effective emitter area of enabled bipolar transistors of the first plurality of bipolar transistors. The first selected subset of the first plurality of bipolar transistors is less than all of the first plurality of bipolar transistors. The temperature sensor circuit includes an output coupled to provide, based on the first and second current legs, a first output current which is indicative of a temperature of the temperature sensor circuit.

In another embodiment, a temperature sensor circuit includes a first current leg including a first bank of bipolar transistors coupled between a first circuit node and a second circuit node. The first bank includes a first plurality of bipolar transistors coupled in parallel with each other. The temperature sensor circuit includes a second current leg including a second bank of bipolar transistors coupled between a third circuit node and a fourth circuit node and a first resistor coupled the fourth circuit node. The second bank includes a second plurality of bipolar transistors coupled in parallel with each other. The temperature sensor circuit includes a controller configured to, for each rotation of a plurality of rotations enable a subset of the second plurality of bipolar transistors in the second bank, and for each of a plurality of time periods within the rotation, enable a different subset of the first plurality of bipolar transistors in the first bank. A number of bipolar transistors in the subset of the second plurality of bipolar transistors is greater than a number of bipolar transistors in each different subset of the first plurality of bipolar transistors. The temperature sensor circuit includes an output coupled to provide, based on the first and second current legs, a first output current which is indicative of a temperature of the temperature sensor circuit.

In a temperature sensor circuit having a first current leg with a first bank of bipolar transistors and a second current leg with a second bank of bipolar transistors, wherein the first bank includes a first plurality of bipolar transistors coupled in parallel with each other and the second bank includes a second plurality of bipolar transistors coupled in parallel with each other, another embodiment includes a method. The method includes providing an output current based on the first and second current legs, wherein the output current is indicative of a temperature of the temperature sensor circuit. The method includes while providing the output current, performing a set of rotations on the second bank of bipolar transistors. For each rotation of the set of rotations enabling a subset of the second plurality of bipolar transistors in the second bank, and for each of a plurality of time periods within the rotation, enabling a different subset of the first plurality of bipolar transistors in the first bank. The first plurality of bipolar transistors has an effective emitter area of enabled bipolar transistors that is less than an effective emitter area of enabled bipolar transistors of the second plurality of bipolar transistors.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A temperature sensor circuit comprising:
   a first current leg having a first bank of bipolar transistors coupled between a first circuit node and a second circuit node, wherein the first bank includes a first plurality of bipolar transistors coupled in parallel with each other;

a second current leg having a second bank of bipolar transistors coupled between a third circuit node and a fourth circuit node and a first resistor coupled to the fourth circuit node, wherein the second bank includes a second plurality of bipolar transistors coupled in parallel with each other;

a controller configured to, for a first time period, enable a first selected subset of the first plurality of bipolar transistors in the first bank and enable a first selected subset of the second plurality of bipolar transistors in the second bank, wherein for the first time period, the second plurality of bipolar transistors has a greater effective emitter area of enabled bipolar transistors than an effective emitter area of enabled bipolar transistors of the first plurality of bipolar transistors;

wherein the first selected subset of the first plurality of bipolar transistors is less than all of the first plurality of bipolar transistors; and an output coupled to provide, based on the first and second current legs, a first output current which is indicative of a temperature of the temperature sensor circuit.

2. The temperature sensor circuit of claim 1, wherein for the first time period, the first selected subset of the second plurality of bipolar transistors is less than all of the second plurality of bipolar transistors.

3. The temperature sensor circuit of claim 1, wherein a collector electrode of each of the first plurality of bipolar transistors is coupled to the first circuit node, and an emitter electrode of each of the first plurality of bipolar transistors is coupled to the second circuit node, and a collector electrode of each of the second plurality of bipolar transistors is coupled to the third circuit node, and an emitter electrode of each of the second plurality of bipolar transistors is coupled to the fourth circuit node.

4. The temperature sensor circuit of claim 1, wherein each bipolar transistor in the first bank and in the second bank is characterized as an NPN bipolar transistor.

5. The temperature sensor circuit of claim 1, wherein a number of transistors of the first selected subset of the first plurality of bipolar transistors is one.

6. The temperature sensor circuit of claim 1, wherein the controller is configured to, for each rotation of a plurality of rotations:

enable a subset of the second plurality of bipolar transistors in the second bank, and for each of a plurality of time periods within the rotation, enable a different subset of the first plurality of bipolar transistors in the first bank, wherein a number of bipolar transistors in the subset of the second plurality of bipolar transistors is greater than a number of bipolar transistors in each different subset of the first plurality of bipolar transistors.

7. The temperature sensor circuit of claim 1, wherein the controller is coupled to provide a first plurality of select signals, each for enabling a corresponding bipolar transistor of the first plurality of bipolar transistors, and provide a second plurality of select signals, each for enabling a corresponding bipolar transistor of the second plurality of bipolar transistors, wherein the controller is configured to, for the first time period:

assert a first subset of the first plurality of select signals to enable the first selected subset of the first plurality of bipolar transistors, and assert a first subset of the second plurality of select signals to enable a second selected subset of the second plurality of bipolar transistors.

8. The temperature sensor circuit of claim 7, further comprising a first set of multiplexer circuits and a second set of multiplexer circuits, wherein each of the first set of multiplexer circuits is coupled to a base electrode of a corresponding bipolar transistor of the first plurality of bipolar transistors and receives a select signal of the first plurality of select signals, and each of the second set of multiplexer circuits is coupled to a base electrode of a corresponding bipolar transistor of the second plurality of bipolar transistors and receives a select signal of the second plurality of select signals.

9. The temperature sensor circuit of claim 7, wherein the controller is configured to, during the first time period, disable all unselected bipolar transistors of the first plurality of bipolar transistors and of the second plurality of bipolar transistors.

10. The temperature sensor circuit of claim 1, wherein for the first time period, a number of enabled bipolar transistors of the first bank is less than a number of enabled bipolar transistors of the second bank.

11. The temperature sensor circuit of claim 10, wherein the controller is configured to, for a second time period subsequent to the first time period, enable a second selected subset of the first plurality of bipolar transistors in the first bank and enable the first selected subset of the second plurality of bipolar transistors in the second bank, wherein the first selected subset of the second plurality of bipolar transistors includes more bipolar transistors than the second selected subset of the first plurality of bipolar transistors.

12. The temperature sensor circuit of claim 10, wherein the controller is configured to, for a second time period subsequent to the first time period, enable a second selected subset of the first plurality of bipolar transistors in the first bank and enable a second selected subset of the second plurality of bipolar transistors in the second bank, wherein the second selected subset of the second plurality of bipolar transistors includes more bipolar transistors that the second selected subset of the first plurality of bipolar transistors.

13. The temperature sensor circuit of claim 12, wherein the first selected subset and second selected subset of the first plurality of bipolar transistors are mutually exclusive, and wherein the first selected subset and second selected subset of the second plurality of bipolar transistors are mutually exclusive.

14. A temperature sensor circuit comprising:

a first current leg including a first bank of bipolar transistors coupled between a first circuit node and a second circuit node, wherein the first bank includes a first plurality of bipolar transistors coupled in parallel with each other;

a second current leg including a second bank of bipolar transistors coupled between a third circuit node and a fourth circuit node and a first resistor coupled the fourth circuit node, wherein the second bank includes a second plurality of bipolar transistors coupled in parallel with each other;

a controller configured to, for each rotation of a plurality of rotations:

enable a subset of the second plurality of bipolar transistors in the second bank, and for each of a plurality of time periods within the rotation, enable a different subset of the first plurality of bipolar transistors in the first bank, wherein a number of bipolar transistors in the subset of the second plurality of bipolar transistors is greater than a number of bipolar transistors in each different subset of the first plurality of bipolar transistors; and an output coupled to provide, based on the first and second current legs, a first output current which is indicative of a temperature of the temperature sensor circuit.

15. The temperature sensor circuit of claim 14, wherein as a result of the plurality of rotations, all bipolar transistors in the first and second plurality of bipolar transistors have been enabled at least once.

16. The temperature sensor circuit of claim 14, wherein the controller is configured to, during each time period in each rotation, disable all unselected bipolar transistors of the first plurality of bipolar transistors and all unselected bipolar transistors of the second plurality of bipolar transistors.

17. The temperature sensor circuit of claim 14, wherein the controller is configured to provide a corresponding select signal for each bipolar transistor in the first and second plurality of bipolar transistors, wherein each subset of the second plurality of transistors in the second bank and each different subset of the first plurality of transistors in the first bank are enabled by the controller asserting the corresponding select signals.

18. In a temperature sensor circuit having a first current leg with a first bank of bipolar transistors and a second current leg with a second bank of bipolar transistors, wherein the first bank includes a first plurality of bipolar transistors coupled in parallel with each other and the second bank includes a second plurality of bipolar transistors coupled in parallel with each other, a method comprising:
providing an output current based on the first and second current legs, wherein the output current is indicative of a temperature of the temperature sensor circuit; and
while providing the output current, performing a set of rotations on the second bank of bipolar transistors, wherein, for each rotation of the set of rotations:
enabling a subset of the second plurality of bipolar transistors in the second bank, and for each of a plurality of time periods within the rotation, enabling a different subset of the first plurality of bipolar transistors in the first bank, the first plurality of bipolar transistors having an effective emitter area of enabled bipolar transistors that is less than an effective emitter area of enabled bipolar transistors of the second plurality of bipolar transistors.

19. The method of claim 18, wherein a number of bipolar transistors in the subset of the first plurality of bipolar transistors is less than a number of bipolar transistors in each different subset of the second plurality of bipolar transistors.

20. The method of claim 18, wherein performing the set of rotations results in all bipolar transistors in the first and second plurality of bipolar transistors being enabled at least once.

* * * * *